(12) United States Patent
Schmidt et al.

(10) Patent No.: US 8,297,440 B2
(45) Date of Patent: Oct. 30, 2012

(54) CASE WITH SUPPORT MECHANISM FOR AN ELECTRONIC DEVICE HAVING A SCREEN

(75) Inventors: Michael Schmidt, Chicago, IL (US); Jose Luis Padilla, La Grange Park, IL (US); Harsh Gandhi, Carol Stream, IL (US)

(73) Assignee: Fellowes, Inc., Itasca, IL (US)

( * ) Notice: Subject to any disclaimer, the term of this patent is extended or adjusted under 35 U.S.C. 154(b) by 0 days.

(21) Appl. No.: 12/984,297

(22) Filed: Jan. 4, 2011

(65) Prior Publication Data

US 2012/0168323 A1 Jul. 5, 2012

(51) Int. Cl.
*B65D 85/00* (2006.01)
*F16M 11/00* (2006.01)
*A47G 1/24* (2006.01)

(52) U.S. Cl. ............... 206/320; 248/176.3; 248/454

(58) Field of Classification Search ............ 206/305, 206/320; 248/126, 176.1, 444, 454–460, 248/676, 688, 693, 176.3
See application file for complete search history.

(56) References Cited

U.S. PATENT DOCUMENTS

| | | | |
|---|---|---|---|
| 4,113,212 A | 9/1978 | Coriden | |
| 4,693,444 A | 9/1987 | Williams et al. | |
| 4,735,394 A | 4/1988 | Facco | |
| 4,819,266 A * | 4/1989 | Awakowicz et al. | 248/126 |
| 4,940,204 A | 7/1990 | Nelson et al. | |
| 5,385,282 A | 1/1995 | Chen | |
| 5,620,163 A | 4/1997 | Wu | |
| 6,003,831 A | 12/1999 | Coleman | |
| 6,286,737 B1 | 9/2001 | Whitley | |
| 6,752,299 B2 | 6/2004 | Shetler et al. | |
| 7,318,521 B2 * | 1/2008 | Lau | 206/45.24 |
| 7,320,451 B2 * | 1/2008 | Ogawa | 248/161 |
| 7,980,526 B2 * | 7/2011 | Lord et al. | 248/444 |
| 8,016,107 B2 * | 9/2011 | Emsky | 206/320 |
| 2003/0089832 A1 | 5/2003 | Gold | |
| 2006/0175370 A1 | 8/2006 | Arney | |
| 2006/0237495 A1 | 10/2006 | Chen | |
| 2007/0125814 A1 | 6/2007 | Roh | |
| 2008/0314941 A1 | 12/2008 | Knych et al. | |
| 2011/0034221 A1 | 2/2011 | Hung et al. | |

OTHER PUBLICATIONS

International Preliminary Report on Patentability for PCT International Patent Application No. PCT/US2008/066264, mailed on Jun. 14, 2010.
International Search Report and Written Opinion for International Patent Application No. PCT/US2008/066264, mailed Oct. 31, 2008.

(Continued)

*Primary Examiner* — Bryon Gehman
(74) *Attorney, Agent, or Firm* — Pillsbury Winthrop Shaw Pittman LLP

(57) ABSTRACT

A case for use with an electronic device having a screen has a base and a support mechanism. The support mechanism has a flexible body that is movable relative to the base between a first (substantially flat) position and a second position. The flexible body is configured to bend into a convex configuration and extend in a direction away from the outer surface of the base in the second position. The body in the second position can be used to engage a flat surface and to support the electronic device in an at least partially vertical viewing position to display the screen on the electronic device. The support mechanism may include a single piece or two arms configured to move relative to each other. The support mechanism may move in a longitudinal or a lateral direction relative to the base.

12 Claims, 10 Drawing Sheets

OTHER PUBLICATIONS

Product Information Sheet, Clip & Carry "Holster that Weapon", accelerate magazine, Technocel, p. 18 (date unknown), Date is assumed prior to Jan. 4, 2011).

Website Information Sheet for MyFi Belt Clip Stand, Jun. 20, 2007, obtained from url: <http://www.satelliteradioexperts.com/Delphi-MyFi-Belt-Clip-Stand_p_16-128.html>.

Website Information Sheet for Acrylic iPhone Case from Belkin, Jun. 19, 2007. obtained from url: <http://www.iphonefreak.com/2007/06/acrylic_iphone_.html>.

Website Information Sheet for Brenthaven Flip Case for iPod 60/80GB, Dec. 8, 2006, obtained from url: <http://www.store.apple.com/1-800-MY-APPLE/WebObjects/AppleStore.woa>.

Website Information Sheet for Agent 18 VideoShield Kit for 60 GB and 80GB iPod, Dec. 8, 2006, obtained from url: <http://www.store.apple.com/1-800-MY-APPLE/WebObjects/AppleStore.woa>.

Website Information Sheet for Belkin Kickstand Case for iPod (Black), Dec. 8, 2006, obtained from url: <http://www.store.apple.com/1-800-MY-APPLE/WebObjects/AppleStore.woa>.

* cited by examiner

CASE WITH SUPPORT MECHANISM FOR AN ELECTRONIC DEVICE HAVING A SCREEN

BACKGROUND OF THE INVENTION

1. Field of Invention

The present invention is generally related to a case for use with an electronic device having a screen. More specifically, the invention relates to a detachable case having ergonomic cushioning for use of an electronic device and for displaying a screen of the electronic device in a partially vertical or inclined viewing position with respect to a flat surface.

2. Background

Manufacturing companies of portable, electronic devices, such as cellular phones and personal digital assistants (PDAs), for example, are integrating music and/or video capabilities into such devices in addition to texting (SMS or MMS) capabilities. Also, many known music or MP3 players are incorporating video capabilities. The user may need to view the screen to watch a video and have the need to interact with the screen of the electronic device (e.g., using a touchpad, viewing incoming calls, viewing a clock feature).

Some cases are large and bulky in a user's pocket. Devices for carrying portable, electronic devices such as cell phones and PDAs are known for removably attaching the electronic device to a user's body via a clip that is attached to a belt or an article of clothing. These devices generally do not assist in displaying the screen of the electronic device.

Some cases are not ergonomic and fail to provide support and/or cushioning for a user's hand(s) and/or fingers. For example, when a user holds an electronic device for an extended period of time, e.g., when watching a video, playing a game, or messaging, the user's fingers and/or hands can easily tire.

Generally, if a user wanted to watch a video on a cell phone, for example, the user is required to hold the phone in their hand or lean it against an object on a flat surface. Additionally, prior art devices for displaying electronic devices on the surface of a desk or a table, for example, include easels or stands in which the electronic device is seated on. Other display devices include protecting carrying cases having an opening in which the electronic device is removed from the cases and placed within the opening to vertically position the screen of the electronic device. One example of a clip device that may also serve as a stand is the "MyFi Belt Clip Stand" by Delphi.

SUMMARY OF THE INVENTION

One aspect of the invention provides a case for use with an electronic device having a screen. The case includes a base for receiving the electronic device and a support mechanism. The support mechanism includes a first arm and a second arm movable relative to the base and to each other between a first position and a second position. Each arm has an inner surface constructed and arranged to lie substantially flat against an outer surface of the base when in the first position. An outer surface of each of the first and second arms is positioned to extend in a direction away from the outer surface of the base in the second position.

Another aspect of the invention provides an attachment device for a portable electronic device having a screen. The attachment device includes a base for receiving the electronic device and a support mechanism. The support mechanism includes a first arm and a second arm movable relative to the base and to each other between a first position and a second position. Each arm has a flexible body with an inner surface and an outer surface. Each flexible body is configured to move between a substantially flat configuration in the first position and a substantially convex configuration in the second position with respect to the base. The outer surface of each of the first and second arms is positioned to extend in a direction away from an outer surface of the base in the second position.

Yet another aspect of the invention provides an attachment device for a portable electronic device having a screen. The attachment device includes a base for receiving the electronic device and a support mechanism. The support mechanism has a support mechanism comprising a flexible arm that is movable relative to the base in a longitudinal direction between a first position and a second position. The flexible arm has a flexible body with an inner surface, an outer surface, and respective ends. The flexible body is configured to move between a substantially flat configuration in the first position and a substantially convex configuration in the second position with respect to the base. The outer surface of the flexible arm is positioned to extend in a direction away from the outer surface of the base in the second position.

Other features and advantages of the present invention will become apparent from the following detailed description, the accompanying drawings, and the appended claims.

BRIEF DESCRIPTION OF THE DRAWINGS

FIGS. 1-7 illustrate a front view, a side view, a back view, a bottom (or top) view, a longitudinally sectional view, a transverse sectional view, and a back plan view, respectively, of a case for an electronic device in accordance with an embodiment of the present invention;

DETAILED DESCRIPTION OF THE ILLUSTRATED EMBODIMENT(S) OF THE INVENTION

Figure 3:
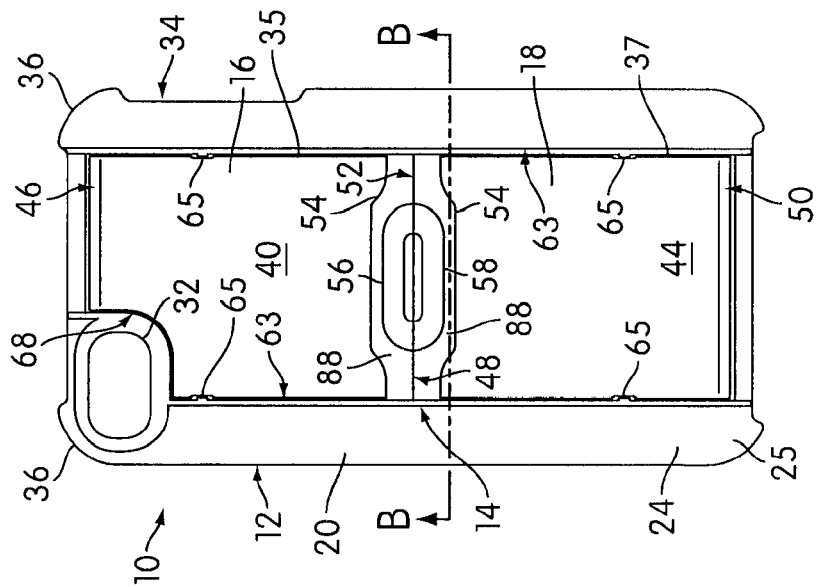
Figure 2:
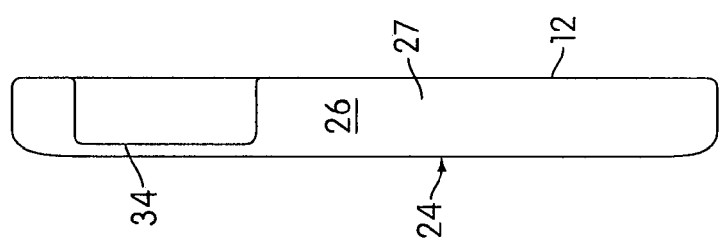
Figure 1:
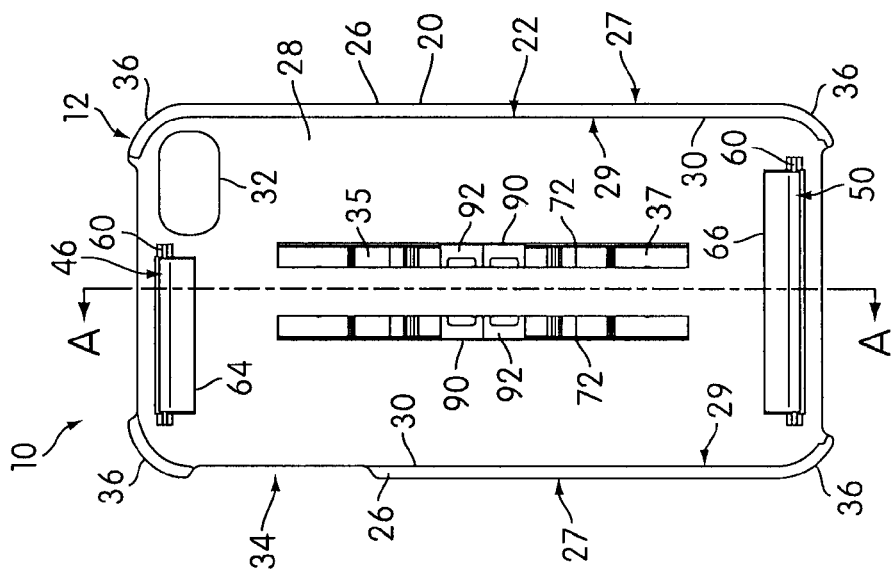
Figure 4:
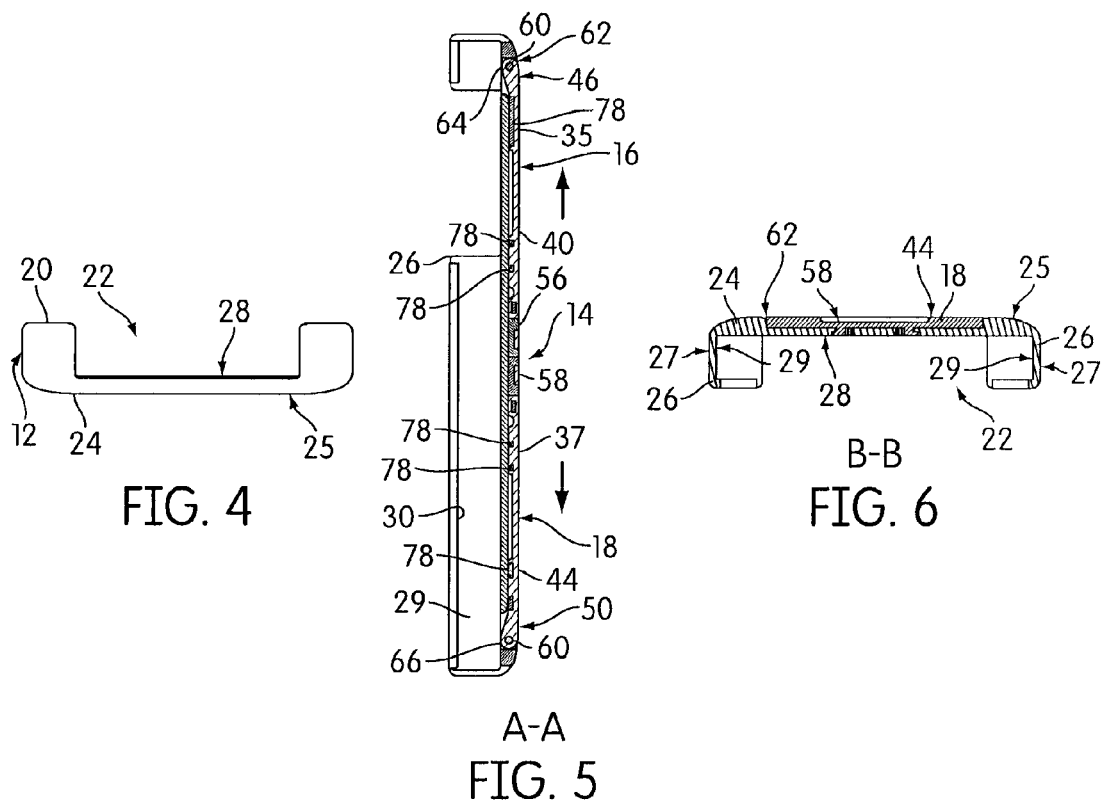
Figure 7:
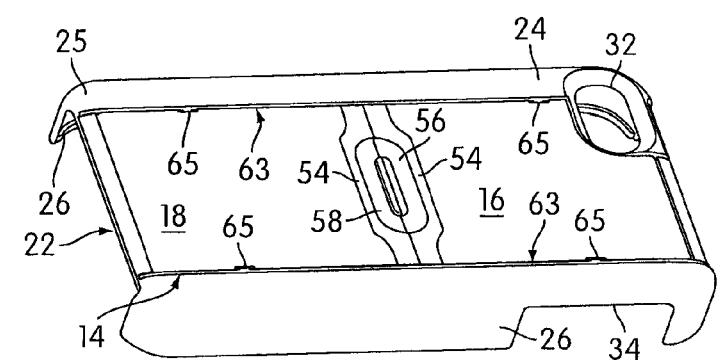

FIGS. 1-7 illustrate a front, a side, a back, a top/bottom, a longitudinally sectional, a transverse sectional, and a back plan view, respectively, of a case 10 in accordance with an embodiment of the present invention. The case 10 comprises a base 12 and mechanism 14 with first and second arms 16 and 18. The case 10 is a detachable device and may be used for carrying an electronic device. Generally, the case 10 may be formed using processes such as injection molding. In an embodiment, the case 10 is preferably injection-molded plastic.

The base 12 is designed to receive an electronic device 100 (shown in FIGS. 12-14) such as a cellular phone, PDA, music player (e.g., MP3 player), tablet, gaming device, and the like, that has a screen for displaying or viewing. The base 12 comprises a body 20 with a receiving opening 22. The body 20 may comprise a back wall 24 and one or more side walls 26 that extend from the back wall 24 which form the receiving opening 22. The back wall 24 has back or outer surface 25 and an inside or inner surface 28. In some embodiments, the back wall 24 may have one or more openings 32 that correspond to features of an electronic device. For example, an electronic device may have a camera associated therewith. In some embodiments, the opening(s) 32 in the back wall 24 may correspond to a placement of a lens and/or flash device of the associated camera.

The one or more side walls 26 of the base 12 comprise an outer surface 27 and an inside surface 29. The side walls 26 may also have an outward edge 30. In some embodiments, the outward edge 30 of one or more side walls 26 comprises a lip for removably grasping a front of the electronic device 100 when the device is inserted therein. In some embodiments, one or more of the one or more side walls 26 may have one or more openings 34 that correspond to features of an electronic device. For example, an electronic device may have button(s), key(s), slot(s), or port(s) on its sides. In some embodiments, the opening(s) 34 in the one or more side walls 26 may correspond to a placement of such button(s), key(s), slot(s), or port(s).

Dimensions of the one or more side walls 26 may vary according to the type of electronic device to be held in the case 10. For example, in some embodiments, a side wall 26 may be an elongate side wall that extends substantially in the longitudinal direction of the case 10. Side wall 26 may be of substantially similar length as back wall 24. In some embodiments, one or more side walls 26 may be edge(s) 36 formed in an area corresponding to edge(s) of the electronic device. Such edge(s) 36 may be formed with an elongate side wall 26, or without. Edge(s) 36 may be rounded or rectangular, for example.

Generally, the one or more side walls 26 may comprise any dimension and may be provided in areas that allow for insertion and capturing of the electronic device in the receiving opening 22. It should be understood that while the illustrated embodiment shows a limited number of openings 32 and 34 within its back and side walls 24, 26, that any number of openings may be formed or provided therein, and that the placement of such openings is not limited. Such openings, including openings 32 and 34, may be shaped to provide access to a feature of the electronic device. However, such shapes are also not limiting. Furthermore, although not shown in FIGS. 1-7, in some embodiments, base 12 may comprise a top wall and/or a bottom wall.

An electronic device may be inserted into the base 12 such that its back is positioned adjacent or against inner surface 28 of the back wall 24 and its sides positioned adjacent or against inner surface(s) 29 of the one or more side walls 26. The electronic device may be secured within the receiving opening 22 via a friction-fit or snap-fit, for example. In some embodiments, the lip of outward edge 30 may assist in retaining the electronic device in the case 10. The base 12 also allows a user to remove the electronic device from the case 10.

Figure 15:
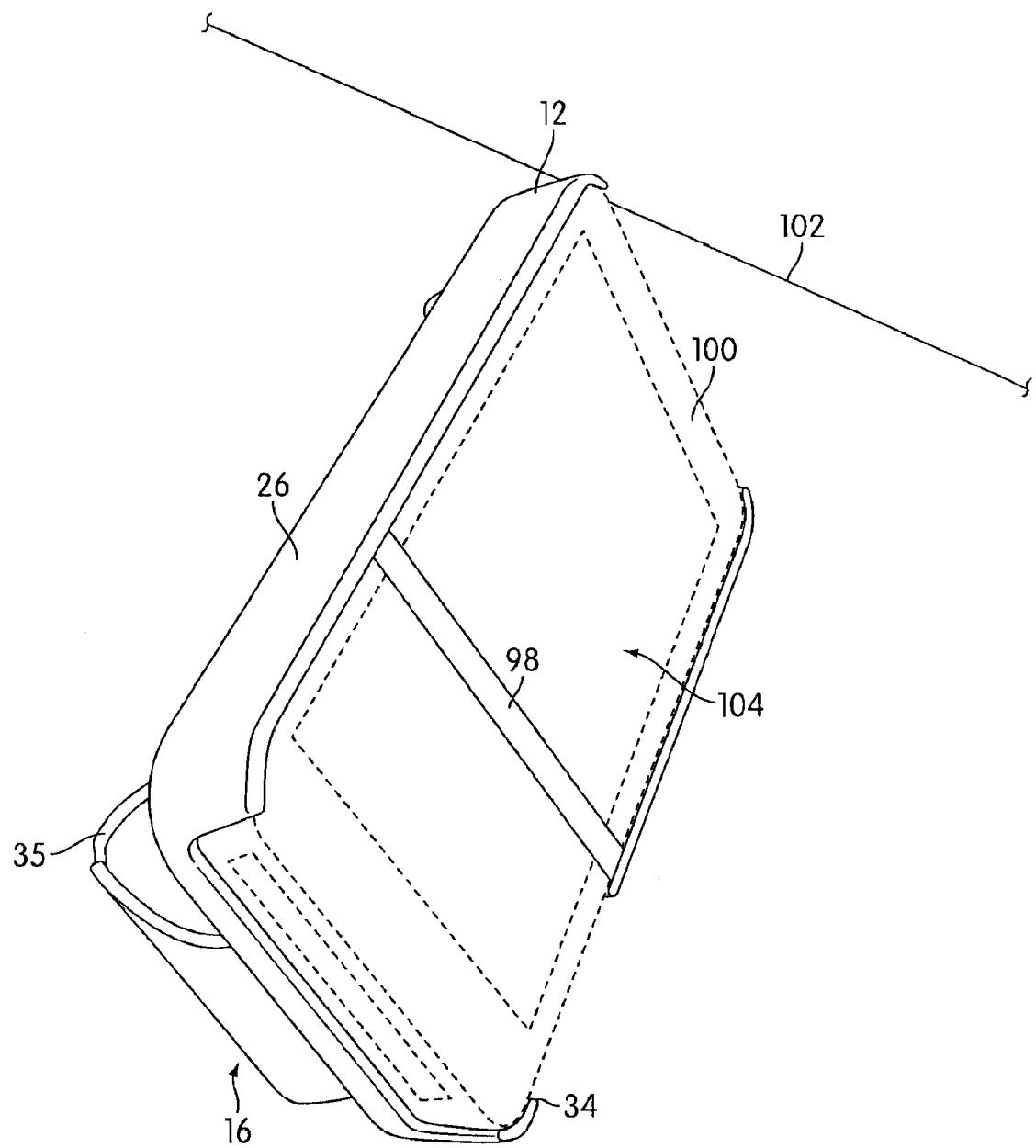
FIG. 15 illustrates a front perspective view of a case for an electronic device in accordance with another embodiment of the present invention.

In some embodiments, a support strap 98, band, or bar may be included with case 10. The support strap 98 may be used for securing the electronic device 100 relative to base 12. As shown in FIG. 15, in an embodiment, strap 98 may extend across a front surface of the electronic device 100 (in a lateral direction) after the device is inserted into the base 12. In another embodiment, the support strap 98 may extend in a longitudinal direction. In yet another embodiment, two or more straps 98 may be provided.

In some embodiments, support mechanism 14 comprises a first arm 16 and a second arm 18. Each arm 16, 18 is movable relative to the base 12 and to each other between a first (home) position (e.g., see FIG. 7) and a second (in use) position (e.g., see FIG. 12). The method of opening the arms into the second (in use) position is described further with reference to FIGS. 10-13. When the first and second arms 16, 18 are in the first (home) position, such as shown in FIGS. 3 and 5, the first and second arms 16, 18 are in a substantially flat configuration relative to back wall 24. In some embodiments, the first and second arms 16, 18 are positioned to lay substantially flat against the back wall 24. In some embodiments, the respective outer surfaces 40 and 44 of the arms 16 and 18 are constructed and arranged to lie substantially flush with outer surface 25 of the back wall 24 of base 12. For example, FIG. 6 illustrates a cross section B-B of FIG. 3 showing how outer surface 44 of second arm 18 is substantially flush with outer surface 25 of back wall 24 when arm 18 is in a first position.

Figure 9:
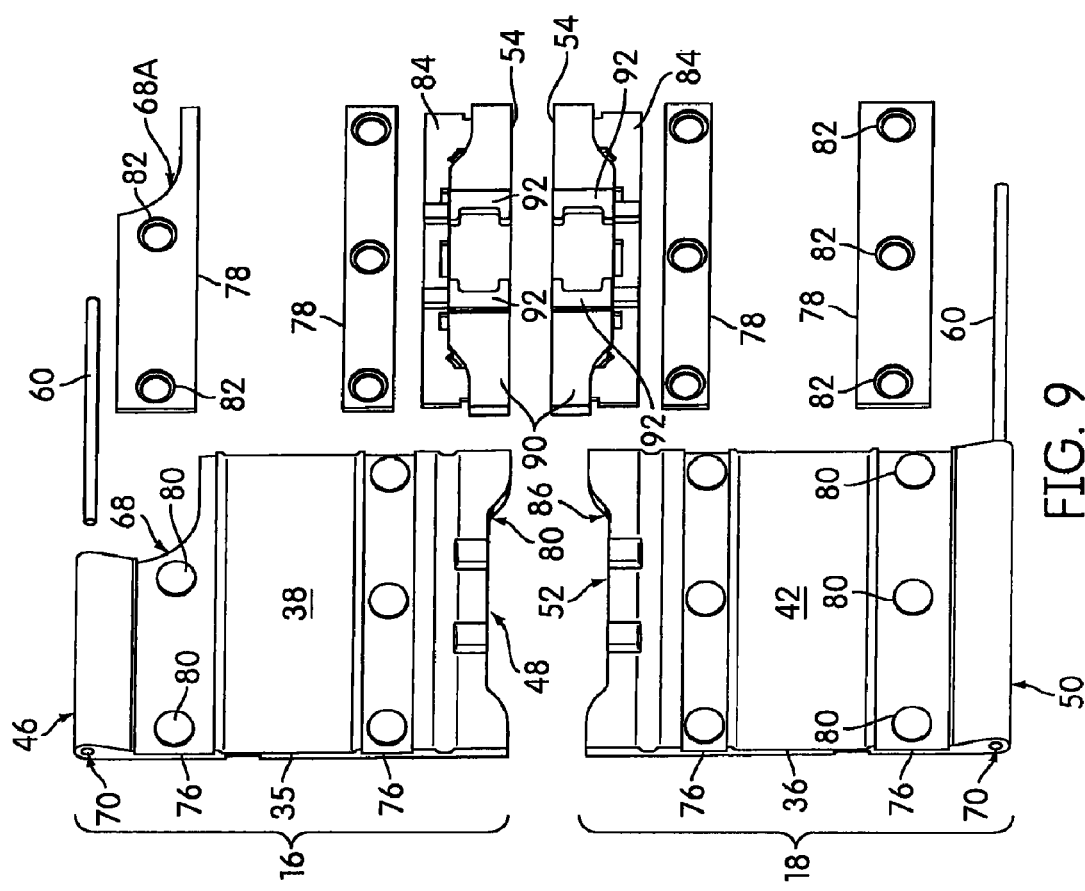
FIG. 9 illustrates a detailed plan view of parts of arms of a support mechanism of the case of FIGS. 1-7.

FIG. 9 illustrates a detailed plan view of parts of arms 16 and 18 of support mechanism 14. Arm 16 comprises a flexible body 35 having an inner surface 38 and an outer surface 40, and a longitudinally fixed edge 46 and a longitudinally moveable edge 48. Arm 18 comprises a flexible body 37, an inner surface 42 and an outer surface 44, and a longitudinally fixed edge 50 and a longitudinally moveable edge 52. In some embodiments, flexible bodies 35 and 37 comprise a flat band or a strip of material. As will be further described below, the flexible bodies 35 and 37 are configured to move with respect to the base 12 between a substantially flat configuration in the first (home) position and a substantially convex configuration in the second (in use) position. In an embodiment, the inner surfaces 38 and 42 are positioned to lie against and/or adjacent outer surface 25 of back wall 24 in the first position, so that the arms 16 and 18 are in a substantially flat configuration.

Figure 11:
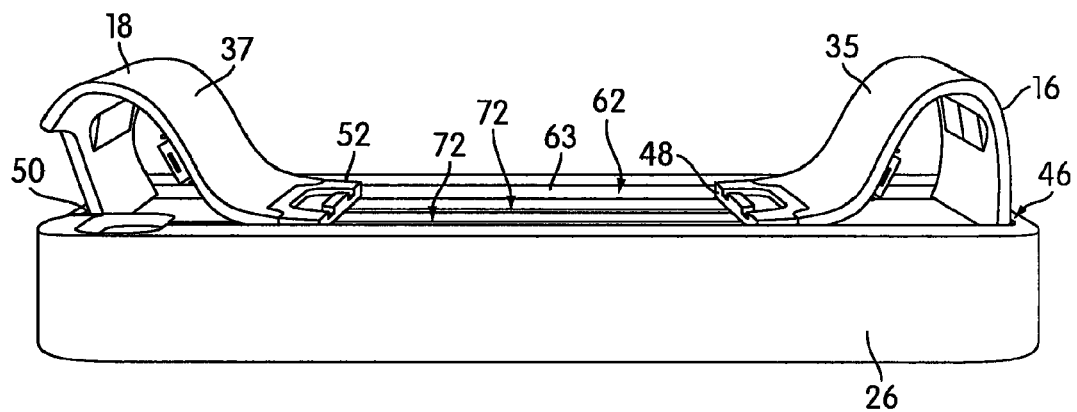
FIG. 11 illustrates a side plan view of the support mechanism of the case of FIGS. 1-7 with both arms in a second position.
Figure 12:
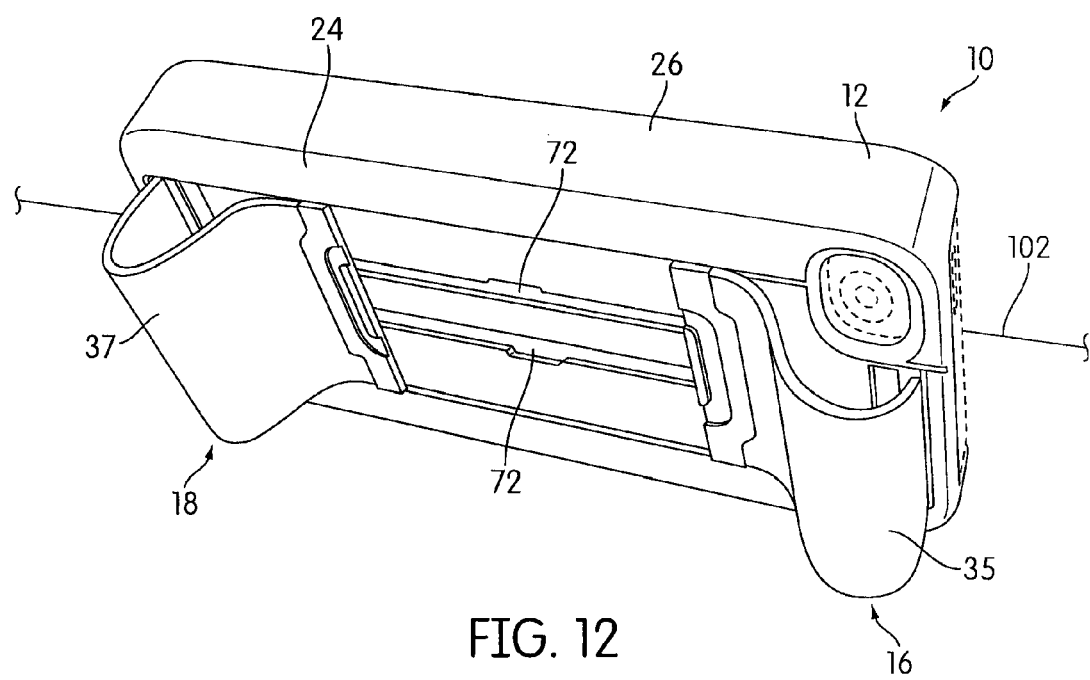
FIGS. 12, 13, and 14 illustrate a back perspective view, a front perspective view, and a front view, respectively, of the case of FIGS. 1-7 in a third position with an electronic device attached thereto in a partially vertical position accordance with an embodiment.

The shape of the first arm 16 and second arm 18 (and/or flexible bodies 35 and 37) may be determined based on a shape of an area on the outer surface 25 of back wall to which they are moved. For example, as shown in FIGS. 5, 11, and 12, back wall 24 may comprise a recessed area 62. Recessed area 62 receives first and second arms 16 and 18 therein when in the first (home) position. Recessed area 62 assists in positioning inner surfaces 38 and 42 of first and second arms 16 and 18 (respectively) to lie substantially flat against outer surface 25 of back wall 24 when the arms 16 and 18 are in the first position. This allows the arms 16 and 18 to have a lower profile than if they protruded substantially from the base 12. In some embodiments, recessed area 62 assists in positioning outer surfaces 40 and 44 of first and second arms 16 and 18 (respectively) to lie substantially flush with outer surface 25 of back wall 24 when the arms 16 and 18 are in the first position.

Recessed area 62 may include outer edges 63 extending in a longitudinal direction along a length of the base 12. Edges of arms 16 and 18 may lie adjacent or against outer edges 63 of recessed area 62 when the support mechanism 14 is in the first position. In an embodiment, outer edges 63 of recessed area 62 may include one or more grasping elements 65 (see, e.g., FIGS. 6 and 7). The grasping elements 65 may protrude from outer edges 63 and may be positioned to temporarily secure an edge of flexible body 35 or 37. For example, a portion of an edge of flexible body 35 or 37 may be positioned adjacent or beneath grasping element 65 when the arm 16 or 18 is flat and in a first (home) position.

The shape of the arms 16 and 18 (and/or flexible bodies 35 and 37) may also or alternatively include openings or cut-outs based on openings in the back wall 24. For example, as shown in FIGS. 3 and 9, first arm 16 may comprise a curved area 68 that is formed to correspond to an area surrounding opening 32 in back wall 24.

The materials used to form flexible bodies 35 and 37 of arms 16 and 18 should not be limiting. In some embodiments, first and second arms 16 and 18 may be formed from a thermoplastic polymer material, such as polypropylene.

Figure 8:
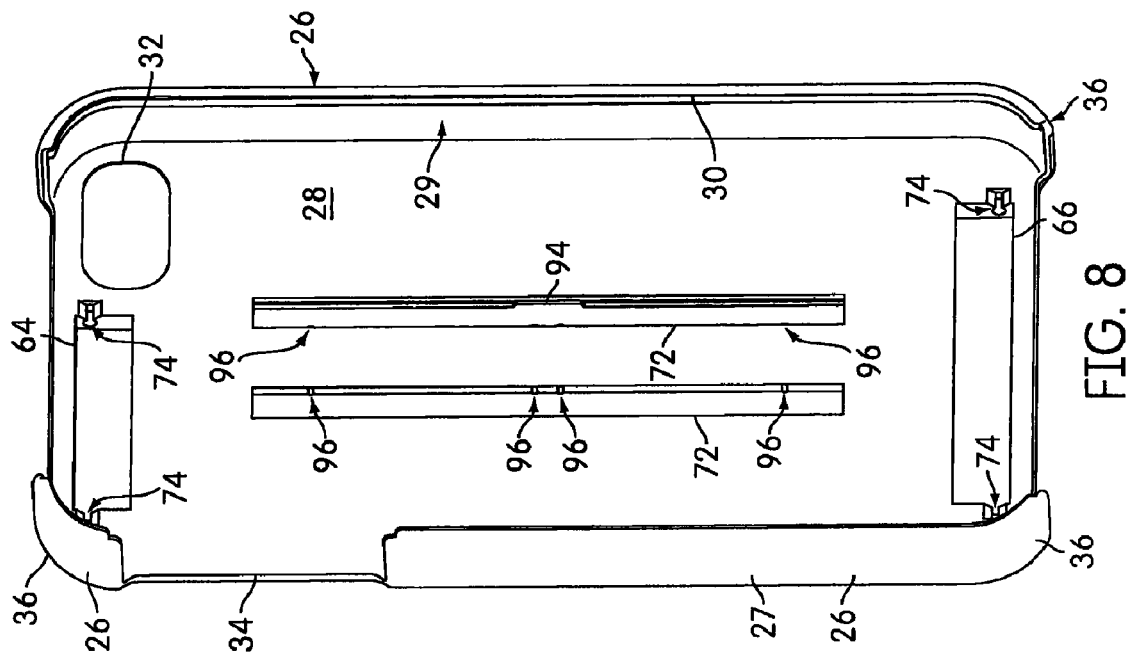
FIG. 8 illustrates a front plan view of the case of FIGS. 1-7.

Any number of methods and devices may be used to attach arms 16 and 18 to body 20 of base 12. In the herein described, non-limiting embodiment, the fixed edges 46 and 50 are configured to pivot or rotate with respect to base 12 within slots 64 and 66. For example, as shown in FIG. 8, a first slot 64 may be provided through back wall 24 adjacent a top portion and a second slot 66 may be provided through back wall 24 adjacent a bottom portion of the body 20 of base 12. Each slot 64 and 66 may comprise an area extending in a transverse direction positioned to receive at least a part of fixed edge 46 or fixed edge 50 therein. Each slot 64 and 66 may also include locking areas or detents 74 adjacent its ends and within back wall 24 for receiving and securing a portion (e.g., fixed edges 46 and 50) to the body 20. Specifically, referring back to the embodiment shown in FIG. 9, both of fixed edges 46 and 50 may comprise a slot or opening 70 that is designed to receive a respective pin 60 therein to enable pivoting or rotation of a portion of the arm 16 and 18 relative to the base 12 along a pivot axis. Ends of each pin 60 may be inserted within detents 74 of back wall 24 adjacent the respective slot 64 or 66.

Inner surfaces 38 and 42 of flexible bodies 35 and 37 may comprise receiving areas 76 with reinforcement strips 78 therein, in accordance with some embodiments. Reinforcement strips 78 reinforce the flexible body 35 or 37. In some cases, strips 78 may assist in moving and bending the body into its second (convex) position. Reinforcement strips 78 are formed from a thin material and may be secured to a flexible body without hindering its positioning in a first (home) position. For example, as shown in FIG. 5 (which is a cross section A-A of FIG. 1), the reinforcement strips 78 are positioned substantially within recessed area 62 of back wall 24 when the arms 16 and 18 are moved to the first (home) position, i.e., substantially flat.

Any number of receiving areas 76 and reinforcement strips 78 may be provided within a flexible body. For example, in the illustrated embodiment, two receiving areas 76 and strips 78 are provided. However, more than two receiving areas 76 and reinforcement strips 78 are also envisioned. In some embodiments, one receiving area 76 and strip 78 is provided in each flexible body 35, 37. In other embodiments, no receiving areas 76 or strips 78 are provided.

Reinforcement strips 78 may be attached to or formed in arms 16 and 18 in any number of ways. For example, in some embodiments, receiving areas 76 may be formed (e.g., molded) to include one or more protrusions 80. Reinforcement strips 78 may comprise connection openings 82 for receiving protrusions 80 of receiving areas 76 therein, and/or one or more portions that correspond to the shape of arms 16 and/or 18, such as a curved portion 68A (e.g., corresponding to a curved area such as 68 on arm 16).

Also shown in detail in FIG. 9 are moveable edges 48 and 52 of arms 16 and 18, respectively. Each of the movable edges 48 and 52 may comprise a finger portion 54. Each finger portion 54 may be attached to its respective flexible body 35 or 37. For example, in the illustrated embodiment, movable edges 48 and 52 may be formed (e.g., molded) with a receiving section 86 for receiving a protruding edge 84 of finger portion 54. However, other attachment configurations and methods may be used and should not be excluded from this disclosure. In other embodiments, the finger portion 54 may be formed such that moveable edge of the flexible body in received therein. In some additional embodiments, each finger portion 54 may be adhered to the edge of the flexible body.

Each finger portion 54 comprises an outer surface 88 and an inner surface 90. Each of the finger portions 54 of the arms 16 and 18 may include a corresponding gripping surface 56 and 58 (respectively) on its outer surface 88. The gripping surfaces 56 and 58 may be provided as an aid to provide a frictional surface for a finger to engage and move first arm 16 and second arm 18 of the mechanism 14 from a first (home) position to a second (in use) position. When the first arm 16 is in first position, for example, the user can use one or more fingers to push against the gripping surface 56 and move the moveable edge 48 in a longitudinal direction, i.e., towards fixed edge 46, and into the second position. Similarly, gripping surface 58 may be used to move arm 18 between the first (home) position and the second (in use) position. The gripping surfaces 56 and 58 may include recesses, protrusions, or other patterns.

The finger portions 54 further include one or more guides 92 for guiding the movement of each arm 16 and 18 with respect to the body 20 of base 12. Guides 92 are provided on inner surfaces 90 of each finger portion 54. For example, as shown in FIG. 9, one or more guides 92 may extend from the inner surface 90 of the respective finger portion 54. The one or more guides 92 may be positioned and secured within at least one track 72 in back wall 24 of base 12. FIG. 8 illustrates two parallel tracks 72 positioned adjacent each other in back wall 24 and extending in a longitudinal direction of body 20. Each guide 92 is moveable from the first position to the second position in the longitudinal direction away from each other within the at least one track 72. The one or more guides 92 may be formed such that they may be snap-fit into the at least one track 72.

To secure the guides 92 and thus the arms 16 and 18 in a substantially flat configuration at least temporarily in the first (home) position, the at least one track 72 may comprise a locking recess 94 (see FIG. 8). Also, each guide 92 may comprise a complimentary locking element. For example, a body or edge of each guide 92 may be formed into a shape that compliments a shape of the locking recess 94. The complimentary locking elements of each guide 92 are configured for temporarily locking with respect to locking recess 94 of the at least one track 72 when the first and second arms 16 and 18 are in the first position, or substantially flat configuration. A position of the locking recess may be determined based on a position of the guides 92 within the track 72 when the arms 16 and 18 are in the first position. In some embodiments, the locking recess 94 may be positioned in a middle or center location along a length of each track 72. Any number of locking recesses 94 may be associated with the one or more tracks 72, and therefore, should not be limiting. Also and/or alternatively, in some embodiments, the at least one track 72 may comprise a locking element and each guide 92 may comprise a locking recess. Other alternatives for at least temporarily locking the arms 16 and 18 in a substantially flat configuration are also envisioned and within the scope of this disclosure.

Additionally and/or alternatively, the one or more guides 92 and/or arms 16 and 18 may be secured via a friction fit within the at least one track 72.

In other embodiments, locking ridges 96 may be provided within the at least one track 72. FIG. 8 illustrates an example of locking ridges 96 provided within a track 72. In some embodiments, for example, locking ridges 96 may be provided in a center and adjacent ends of the tracks 72. Locking ridges 96 at the center can assist in locking the arms 16 and 18 in the first position, parallel and flat against the outside surface 25 of the case 10. For example, this configuration may be used during phone calls or placement inside a user's pocket. Locking ridges 96 provided adjacent the ends of tracks 72 may be used to lock the arms 16 and 18 in the second position, so that the arms remain open in a convex configuration, and can be used for ergonomic holding of the electronic device (for texting and gaming) as well for viewing when utilized as a stand. Any number of locking ridges 96 may be provided within in tracks 72. For example, sets of locking ridges 96 may be provided in multiple positions along a length of each track 72 such that arms 16 and 18 may be temporarily locked in second, third, or more positions (i.e., each position comprising an extended or convex configuration).

In some embodiments, finger portions 54 are formed from materials that are inflexible and/or harder than the materials used to form flexible bodies 35 and 37. In some embodiments, the finger portions 54 are formed from injection-molded plastic.

Figure 10:
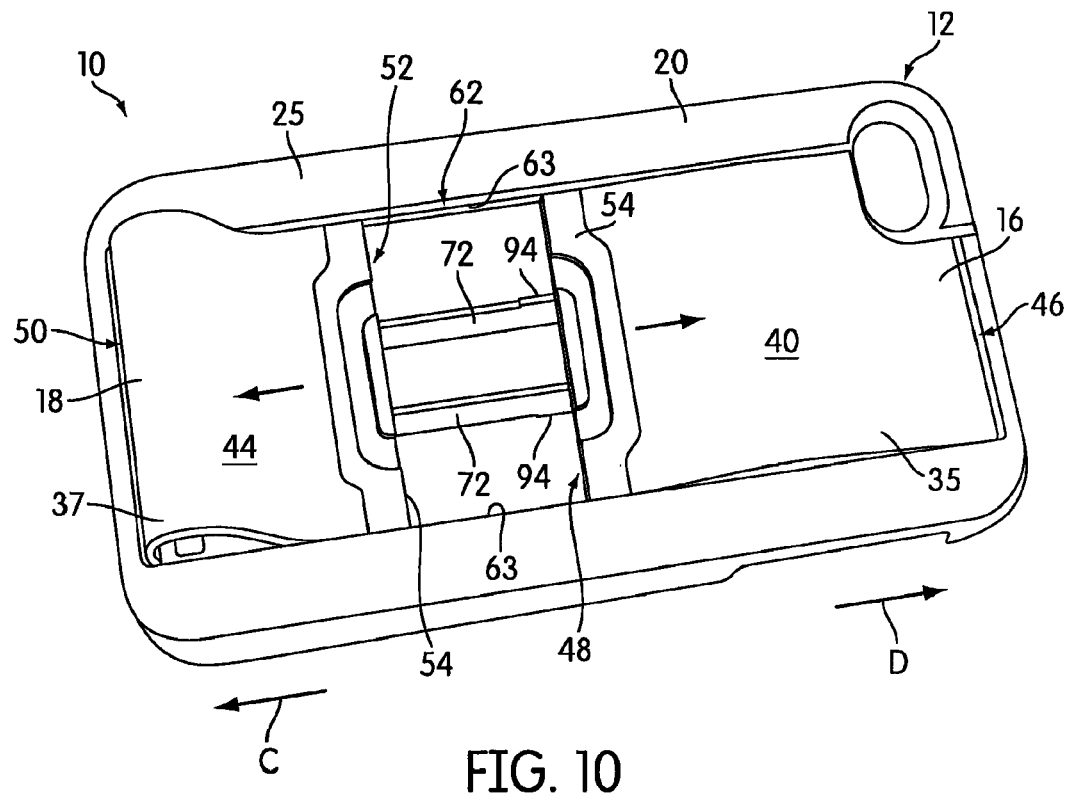
FIG. 10 illustrates a back plan view of the support mechanism of the case of FIGS. 1-7 with one arm in a second position.

The method of opening the arms 16 and 18 from the first (home) position (FIG. 7) into the second (in use) position of the embodiment illustrated in FIGS. 1-9 is now described with reference to FIGS. 10-11. When the second arm 18 is in first position, for example, the user can use one or more fingers to push against or pull the gripping surface 56 of finger portion 54 and move the moveable edge 48 in a longitudinal direction, i.e., towards fixed edge 46 or bottom portion of body 20, as shown by arrow C in FIG. 10. This will bend the flexible body 37 outwardly such that such that outer surface 44 is positioned in a direction away from the outer surface 25 of back wall 24. The flexible body 37 will curve convexly from the body 20 (e.g., see FIG. 11) and will remain in a convex configuration in a second position. Similarly, to move the first arm 16 from its first position, the user can use one or more fingers to push against or pull the gripping surface 56 of finger portion 54 and move the movable edge 52 of arm 16 in a longitudinal direction that is opposite the longitudinal movement of second arm 18. That is, the moveable edge 52 is moved towards fixed edge 50 or top portion of body 20, as shown by arrow D in FIG. 10. This will bend the flexible body 35 outwardly such that outer surface 40 is positioned in a direction away from the outer surface 25 of back wall 24 and in a convex configuration (like flexible body 37, described above). FIG. 11 illustrates a side view of both first and second arms 16 and 18 in a second position and convex configuration. In an embodiment, each arm 16 and 18 comprises a substantially sinusoidal shape in the second position.

It should be noted that the step-by-step individual movement of arms 16 and 18 with respect to body 20 of base 12 is provided for illustrative purposes only. However, it is to be understood that both arms 16 and 18 may be moved substantially at the same time and that the user can view a front of the case and electronic device during such movement. For example, the user may grasp the case 10 or electronic device 100 on a front surface and/or side surface with their thumbs while using one or more fingers to grasp and pull arms 16 and 18 from the first position away from each other and towards top and bottom portions or edges to the second position.

Figure 13:
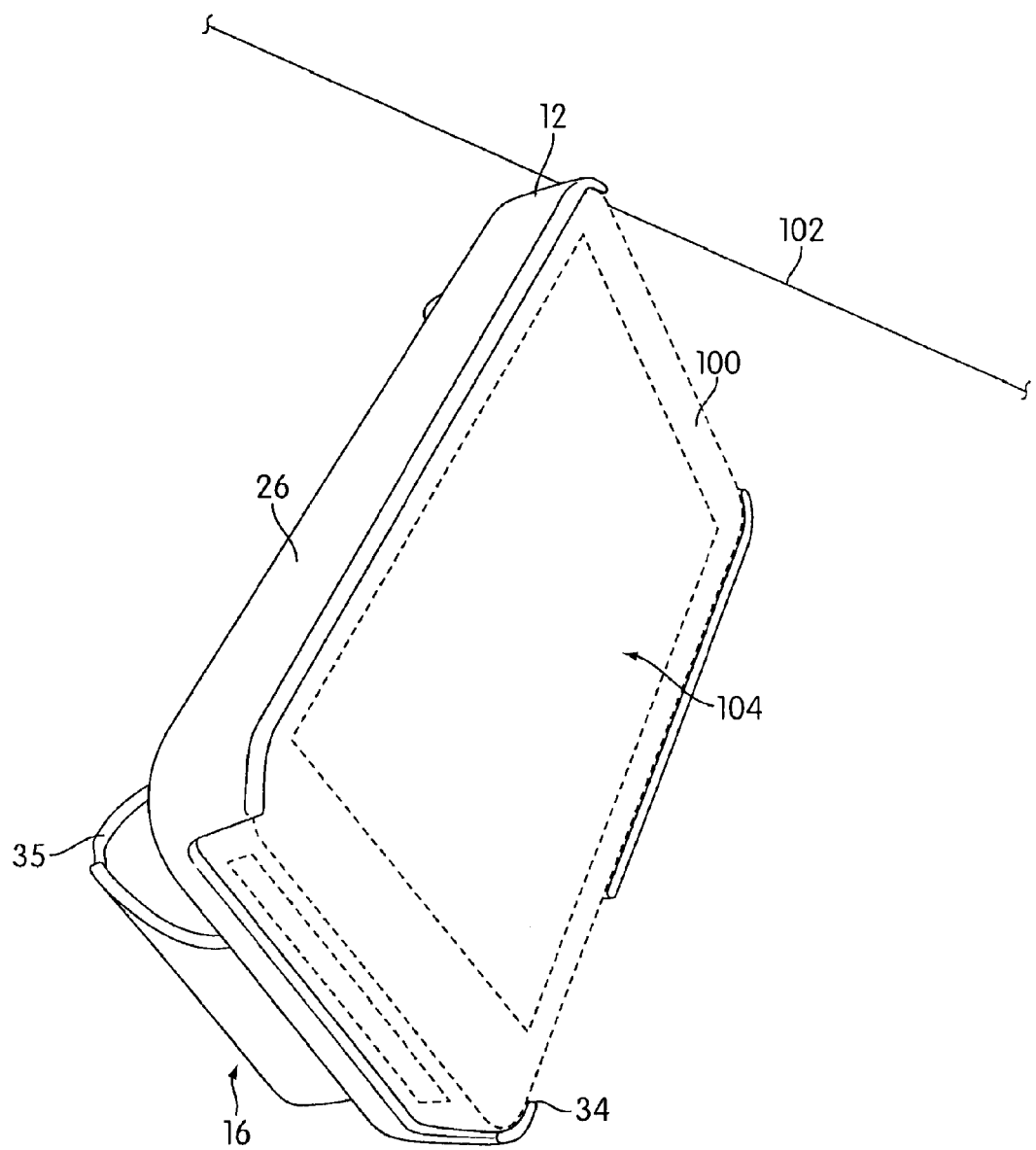
Figure 14:
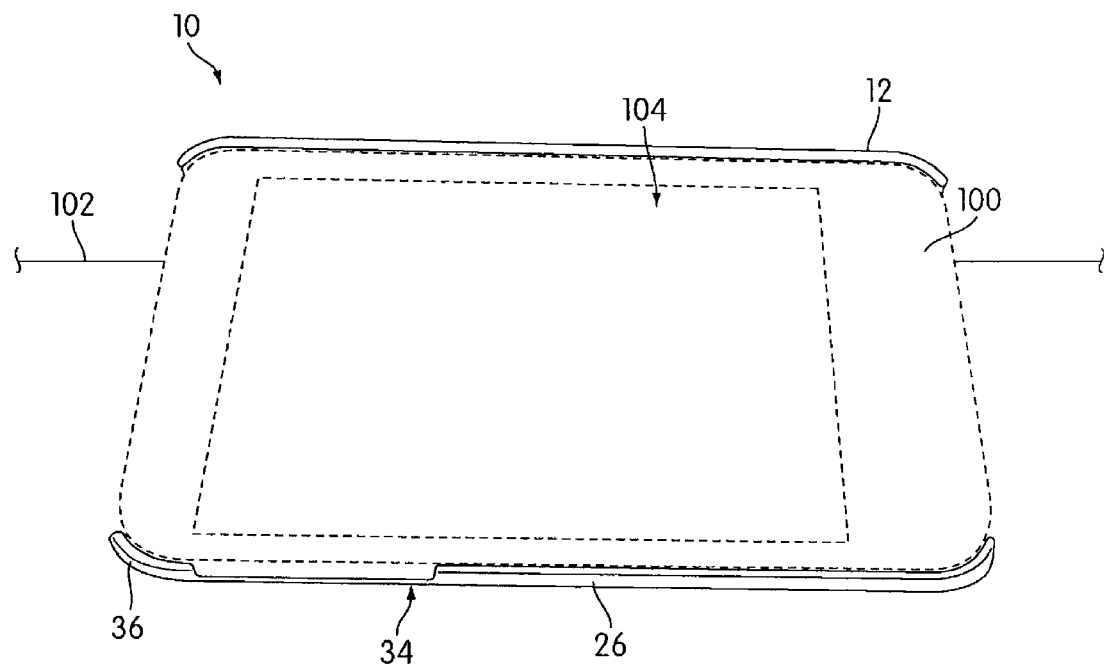

FIGS. 12, 13, and 14 illustrate a back perspective view, a front perspective view, and a front view, respectively, of the case 10 of FIGS. 1-7 in a third position with an electronic device 100 attached thereto. As noted above, electronic device 100 may comprise known, portable devices such as a cellular (cell) phone, PDA, MP3 player, tablet, gaming device, etc. To use the first and second arms 16 and 18 as a support mechanism 14, the electronic device 100 may be first attached to the case 10 via base 12. For example, the electronic device 100 may be inserted into the receiving body 20 of the base 12. One or both of the arms 16 and 18 are moved to a second position, such as shown in FIG. 11. The case 10 is then positioned in a partially vertical or inclined position with respect to substantially flat surface 102. To position the screen of the electronic device 100 such that it is viewable, the support mechanism 14 of the case 10 is positioned such that at least a portion of the arm 16 is in contact with the flat surface 102. Specifically, an outer edge of each of the flexible bodies 35 and 37 of the arms 16 and 18 (in their convex configuration) may be positioned such that it faces and contacts the flat surface 102. The determination of which outer edge contacts the flat surface 102 may be based on the screen position of the electronic device 100.

As shown in FIGS. 12, 13, and 14, the electronic device 100 is positioned for viewing the screen in a partially vertical or inclined position. Thus, the case 10 may be oriented with respect to a flat surface 102 for viewing a screen of an electronic device 100. In some embodiments, when the case 10 is positioned on flat surface 102, the viewing angle corresponds to holding case 10 at an angle of 60 degrees with respect to the flat surface (i.e., the back wall 24 is substantially 60 degrees above the horizontal; the screen is positioned at substantially 120 degrees relative to the horizontal surface 102). It should be noted that the electronic device 100 and case 10 can be positioned either having the left side 26 or the right side 26 of contacting the flat surface 102. Both of these positions can result in a substantially 60 degree angle (the screen being positioned at substantially 120 degrees).

It should also be noted that the angle at which the support mechanism and its body/arms position the electronic device 100 for viewing need not be fixed. For example, as noted above, it is within the scope of this invention that the arms 16 and 18 may be positioned at any number of second, third, etc. positions relative to the base (e.g., positioned at different positions along the track). Such positions may thereby alter an amount at which the body/arms extend from the case 10, and therefore, adjust the viewing angle(s) at which the case is positioned (e.g., adjust the angle at which the back wall is positioned relative to the horizontal of the surface, which thereby adjusts the angle at which the screen is positioned).

The above embodiments of case 10 allow for a dual function in that a user may use the case 10 to assist in allowing the user to position an electronic device with respect to a flat surface and carry the electronic device using the same device. An electronic device is also detachable from case 10.

The case 10 may be held by the user in two planes. The case 10 also provides added grip of the electronic device 100 by allowing a user to grasp at least a portion of the arms 16 and 18 in addition to side walls 26 of the case 10. The arms 16 and 18 enable ergonomic grip of the case 10. Further, the arms 16 and 18 of case 10 can assist in reducing fatigue to a user's hands or fingers when grasping the case 10 for a period of time (e.g., during extensive messaging, such as texting or e-mailing). For example, the extended, convex configuration may support and/or cushion a user's fingers and hand(s) while holding the device.

When the arms 16 and 18 are engaged, the case 10 can also be used as a stand on a surface for horizontal viewing of movies and other media. For example, as shown in FIGS. 12-14, the support mechanism 14 is constructed and arranged such that its arms in the second position are positioned to engage an upwardly facing flat surface 1-2 and to support the electronic device in an at least partially vertical viewing position to display the screen of the device. When the bands are not engaged, the case 10 is slim and easily fits into pockets without adding much bulk to the device.

The case 10 also allows a user to position an electronic device for use. For example, a user may position the electronic device such that a speakerphone, microphone, or other hands-free feature may be oriented toward the location of the user.

Additionally, the case 10 allows a user to position an antenna of an electronic device (e.g., a cellular phone, GPS device, satellite radio) in an at least partially vertical position so as to optimize reception.

Figure 16:
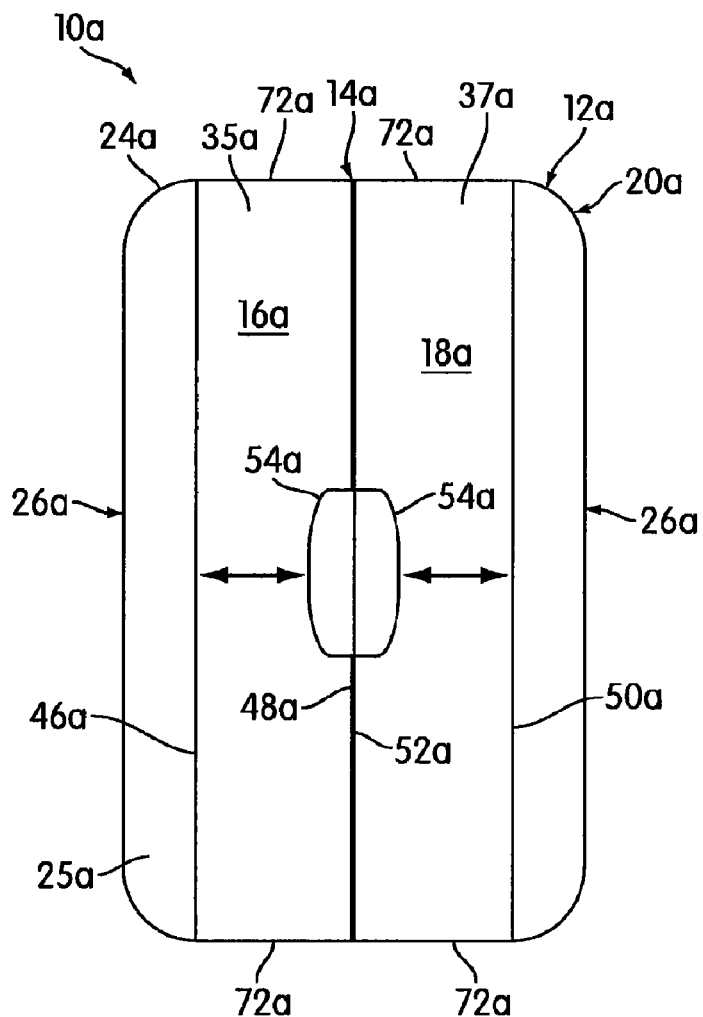
FIGS. 16 and 17 illustrate a back view and a bottom view, respectively, of a case for an electronic device with a support mechanism in accordance with yet another embodiment of the present invention.
Figure 17:
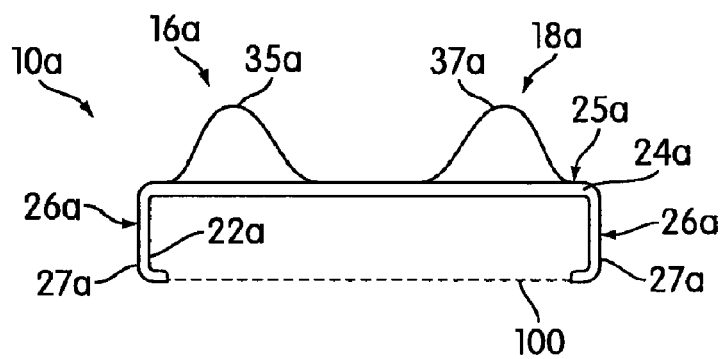

Moreover, as previously noted, the support mechanism 14 may include alternate designs than those shown in FIGS. 1-7. For example, FIGS. 16 and 17 illustrate a back view and a bottom view, respectively, of a case 10a with a support mechanism 14a for an electronic device in accordance with yet another embodiment of the present invention. Many of the components of the embodiment shown in FIGS. 16 and 17 are similar to the components of the embodiment shown in FIGS. 1-7. Support mechanism 14a comprises a first arm 16a and a second arm 18a. Each arm 16a, 18a is movable relative to base 12a and to each other between a first (home) position (e.g., see FIG. 16) and a second (in use) position (e.g., see FIG. 17) in a lateral direction with respect to the base 12 of case 10 (as indicated by the arrows of FIG. 16, for example). When the first and second arms 16a, 18a are in the first (home) position, the first and second arms 16a, 18a are in a substantially flat configuration relative to back wall 24a. In some embodiments, the first and second arms 16a, 18a are positioned to lay substantially flat against the back wall 24a. In some embodiments, the respective outer surfaces of the arms 16a and 18a are constructed and arranged to lie substantially flush with outer surface 25a of the back wall 24a of base 12a.

As described above, arm 16a comprise a flexible body 35a having an inner surface and an outer surface, and a longitudinally fixed edge 46a and a longitudinally moveable edge 48a. Arm 18a comprises a flexible body 37a, an inner surface, and an outer surface, and a longitudinally fixed edge 50a and a longitudinally moveable edge 52a. In some embodiments, flexible bodies 35a and 37a comprise a flat band or a strip of material. The flexible bodies 35a and 37a are configured to move with respect to the base 12 between a substantially flat configuration in the first (home) position and a substantially convex configuration in the second (in use) position. In an embodiment, the inner surfaces are positioned to lie against and/or adjacent outer surface 25a of back wall 24a in the first position, so that the arms 16a and 18a are in a substantially flat configuration. Moveable edges 48a and 52a of arms 16a and 18a may comprise a finger portion 54a. Each finger portion 54a may be attached to its respective flexible body 35a or 37a. Edges of flexible bodies 35a and 37a may be relatively fixed within tracks 72a of the body 12a and may also move within tracks 72a.

To move arms 16a and 18a of case 10a, a user can use one or more fingers to push against or pull the finger portions 54a and move the moveable edges 48a, 52a in a lateral direction, i.e., towards a respective fixed edge 46a, 50a or side portions of body 20, as shown by the arrows of FIG. 16. This will bend the flexible bodies 35a and 37a outwardly such that such that their outer surfaces are positioned in a direction away from the outer surface 25a of back wall 24a. The flexible bodies 35a and 37a will curve convexly from the body 20a and will remain in a convex configuration in a second position. FIG. 17 illustrates a side view of both first and second arms 16a and 18a in a second position and convex configuration. In an embodiment, each arm 16a and 18a comprises a substantially sinusoidal shape in the second position.

The movement of arms 16a and 18a with respect to body 20a of base 12a is provided for illustrative purposes only and not meant to be limiting. For example, a user may grasp the case 10a or electronic device 100 on a front surface and/or side surface with their thumbs while using one or more fingers to grasp and pull arms 16a and 18a from the first position away from each other and towards side portions or edges to the second position.

Figure 18:
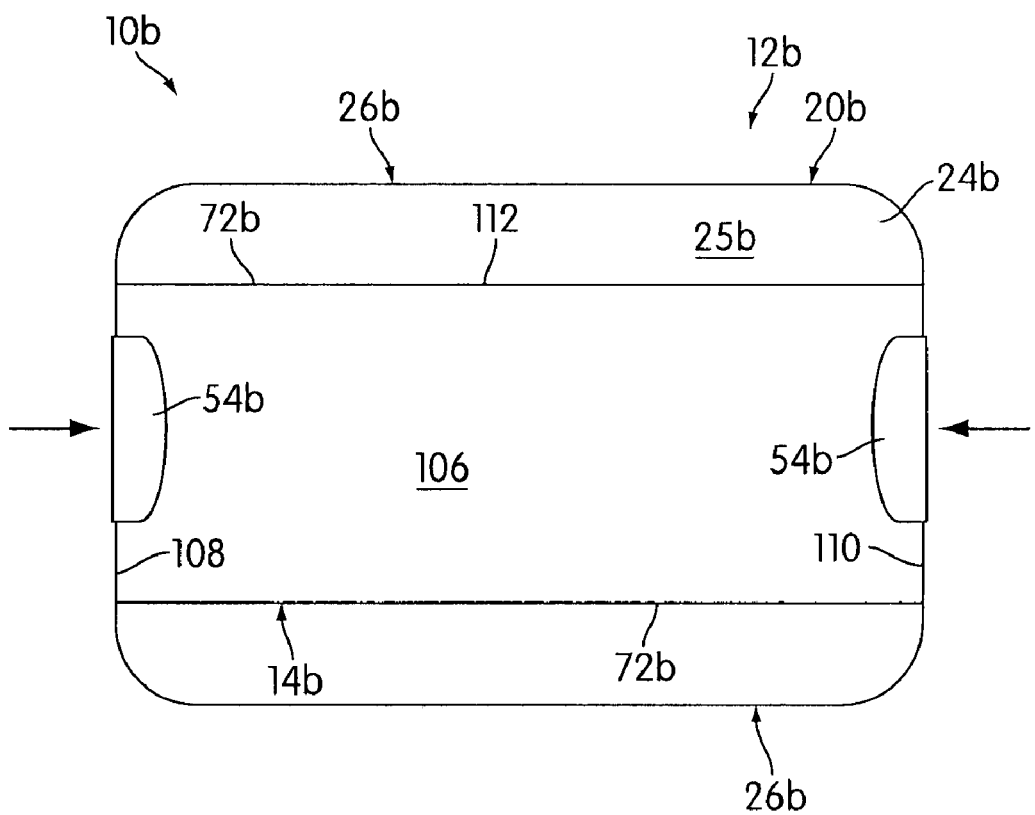
FIGS. 18 and 19 illustrate a back view and a side view, respectively, of a case for an electronic device with a support mechanism in accordance with yet another embodiment of the present invention.
Figure 19:
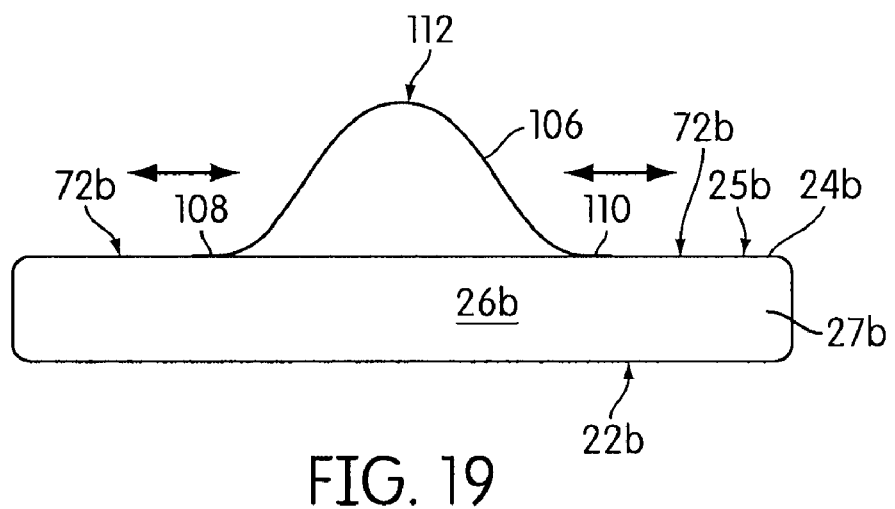

FIGS. 18 and 19 illustrate a back view and a side view, respectively, of a case 10b with a support mechanism 14b for an electronic device in accordance with yet another embodiment of the present invention. Many of the components of the embodiment shown in FIGS. 18 and 19 are similar to the components of the embodiment shown in FIGS. 1-7. Support mechanism 14b comprises a single flexible arm 106 comprising a flexible body 112 with an inner surface, an outer surface, and respective ends 108 and 110. Each end 108 and 110 of body 112 is movable relative to the base 12b and to each other between a first (home) position (e.g., see FIG. 18) and a second (in use) position (e.g., see FIG. 19). When the ends 108 and 110 are in the first (home) position, they are in a substantially flat configuration relative to back wall 24b. For example, the ends 108, 110 are configured to lay adjacent ends of the base 12b and away from each other in the first position. In some embodiments, the ends 108, 110 are positioned to lay substantially flat against the back wall 24b. In some embodiments, the respective outer surface of the body 112 is constructed and arranged to lie substantially flush with outer surface 25b of the back wall 24b of base 12b. In the second position, the ends 108 and 110 of flexible arm 106 may be configured to lie adjacent a center of the base 12b or body 20b and towards each other.

Flexible body 112 may comprise a flat band or a strip of material. As will be further described below, the flexible bodies 35 and 37 are configured to move with respect to the base 12b between a substantially flat configuration in the first (home) position and a substantially convex configuration in the second (in use) position. In an embodiment, the inner surface of body 112 is positioned to lie against and/or adjacent outer surface 25b of back wall 24b in the first position, and extend from outer surface 25b in the second position. Finger portions 54b may be provided at each end 108 and 110. Edges of flexible body 112 may be relatively fixed within tracks 72b of the body 12b. Ends 108 and 110 of body 112 may also move within tracks 72b.

To move ends 108 and 110 of case 10b, a user can use one or more fingers to push against the finger portions 54b and move the ends 108 and 110 in a longitudinal direction, i.e., towards a center of body 20b, as shown by the arrows of FIG. 18. This will bend the flexible body 112 outwardly from the body 20b such that such that the outer surface is positioned in a direction away from the outer surface 25b of back wall 24b. The flexible body 112 will curve convexly from the body 20b and will remain in a convex configuration in a second position. FIG. 18 illustrates a side view of flexible body 112 of arm 106 in a second position and convex configuration. In an embodiment, the arm 106 comprises a substantially sinusoidal shape in the second position.

The movement of ends 108 and 110 with respect to body 20b of base 12ba is provided for illustrative purposes only and not meant to be limiting. For example, a user may grasp the case 10b or electronic device 100 on a front surface and/or side surface with their thumbs while using one or more fingers to grasp and push ends 108 and 110 from the first position away from each other and towards a center area towards each other to the second position.

Like the embodiment of FIGS. 1-7, any of the other herein described or envisioned embodiments may also include alternate positions (third, fourth) wherein the support mechanisms 14a and 14b may extend from their respective base 12a or 12b. The embodiments of FIGS. 16-17 and/or 18-19 are not meant to be limiting.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A case for use with an electronic device having a screen, the case comprising:
    a base for receiving the electronic device comprising at least one track extending in the longitudinal direction;
    a support mechanism comprising a first arm and a second arm movable relative to the base and to each other between a first position and a second position, each of the first and second arms comprising a flexible body configured to move between a substantially flat configuration in the first position and a substantially convex configuration in the second position with respect to the base and having an inner surface constructed and arranged to lie substantially flat against an outer surface of the base when in the first position,
    wherein the outer surface of each of the first and second arms is positioned to extend in a direction away from the outer surface of the base in the second position, wherein each of the first and second arms further comprises a guide, and wherein each guide is moveable from the first position to the second position away from each other within the at least one track.

2. The case according to claim 1, wherein the at least one track comprises a locking recess; wherein each guide comprises a complimentary locking element, and wherein the complimentary locking elements of the guides are temporarily locked with respect to the locking recess of the at least one track when the first and second arms are in the first position.

3. The case according to claim 1, wherein each guide of the first and second arms is hingedly mounted via a hinge to the base, and wherein the flexible body of the respective arm is configured to pivot about its respective hinge during movement from the first position to the second position.

4. The case according to claim 1, wherein the electronic device is removable with respect to the base.

5. The case according to claim 1, wherein the first arm and the second arm are movable relative to the base and to each other between the first position and the second position in a longitudinal direction along a length thereof.

6. The case according to claim 1, wherein the first arm and the second arm are movable relative to the base and to each other between the first position and the second position in a lateral direction along a width thereof.

7. An attachment device for a portable electronic device having a screen, the attachment device comprising:
    a base for receiving the electronic device comprising at least one track extending in the longitudinal direction;
    a support mechanism comprising a first arm and a second arm movable relative to the base and to each other between a first position and a second position;
    each arm comprising a flexible body with an inner surface and an outer surface, each flexible body being configured to move between a substantially flat configuration in the first position and a substantially convex configuration in the second position with respect to the base,
    wherein the outer surface of each of the first and second arms is positioned to extend in a direction away from an outer surface of the base in the second position, wherein each of the first and second arms further comprises a guide, and wherein each guide is moveable from the first position to the second position away from each other within the at least one track.

8. The attachment device according to claim 7, wherein the at least one track comprises a locking recess; wherein each guide comprises a complimentary locking element, and wherein the complimentary locking elements of the guides are temporarily locked with respect to the locking recess of the at least one track when the first and second arms are in the first position.

9. The attachment device according to claim 7, wherein each guide of the first and second arms is hingedly mounted via a hinge to the base, and wherein the flexible body of the respective arm is configured to pivot about its respective hinge during movement from the first position to the second position.

10. The attachment device according to claim 7, wherein the electronic device is removable with respect to the base.

11. The attachment device according to claim 7, wherein the first arm and the second arm are movable relative to the base and to each other between the first position and the second position in a longitudinal direction along a length thereof.

12. The attachment device according to claim 7, wherein the first arm and the second arm are movable relative to the base and to each other between the first position and the second position in a lateral direction along a width thereof.

* * * * *